United States Patent
Hyodo

(10) Patent No.: US 7,310,448 B2
(45) Date of Patent: Dec. 18, 2007

(54) IMAGE PROCESSING METHOD, IMAGE PROCESSING APPARATUS, AND ELECTRONIC CAMERA

(75) Inventor: Manabu Hyodo, Asaka (JP)

(73) Assignee: Fujifilm Corporation, Tokyo (JP)

( * ) Notice: Subject to any disclaimer, the term of this patent is extended or adjusted under 35 U.S.C. 154(b) by 633 days.

(21) Appl. No.: 10/352,910

(22) Filed: Jan. 29, 2003

(65) Prior Publication Data

US 2003/0142880 A1    Jul. 31, 2003

(30) Foreign Application Priority Data

Jan. 29, 2002    (JP) ............................. 2002-020738

(51) Int. Cl.
  *G06K 9/40*    (2006.01)
  *G06K 9/00*    (2006.01)
(52) U.S. Cl. ................... 382/274; 382/167; 382/169
(58) Field of Classification Search ............... 382/274, 382/167, 169
See application file for complete search history.

(56) References Cited

U.S. PATENT DOCUMENTS

| | | | |
|---|---|---|---|
| 5,541,028 A * | 7/1996 | Lee et al. ...................... 430/30 |
| 6,285,798 B1 * | 9/2001 | Lee ............................. 382/260 |
| 6,493,468 B1 * | 12/2002 | Matsuura ..................... 382/274 |
| 6,628,830 B1 * | 9/2003 | Yamazoe et al. ........... 382/168 |
| 6,642,930 B1 * | 11/2003 | Matsuura et al. ........... 345/601 |
| 6,694,051 B1 * | 2/2004 | Yamazoe et al. ........... 382/167 |
| 6,694,052 B1 * | 2/2004 | Matama ....................... 382/169 |
| 6,952,503 B2 * | 10/2005 | Matsuura ..................... 382/274 |
| 7,113,649 B2 * | 9/2006 | Gindele ...................... 382/274 |
| 2002/0008771 A1 * | 1/2002 | Uchino et al. .............. 348/362 |

FOREIGN PATENT DOCUMENTS

JP    2000-184272    6/2000
JP    2001-169178 A    6/2001

* cited by examiner

Primary Examiner—Matthew C. Bella
Assistant Examiner—Wes Tucker
(74) Attorney, Agent, or Firm—Birch, Stewart, Kolasch & Birch, LLP

(57) ABSTRACT

An object of the present invention is to obtain an image photographed with an image-sensing device using a flash, in which the brightness of the image of the subject of the photograph is proper. An integrated value of brightness of a photographed image is obtained; a weighted evaluation value is calculated; contrast of the photographed image is obtained; a gain of an image signal is obtained by using the evaluation value after which, a suppression gain, by which a value of suppressing the gain fluctuates according to the contrast, is obtained in order to correct the brightness of a photographed subject to the proper brightness; a correction gain for making final corrections to an image by using the gain and the suppression gain is calculated; and the image signal is amplified by a gain adjustment circuit, thereby correcting the photographed image.

13 Claims, 5 Drawing Sheets

IMAGE PROCESSING METHOD, IMAGE PROCESSING APPARATUS, AND ELECTRONIC CAMERA

BACKGROUND OF THE INVENTION

Field of the Invention

The present invention relates to an image processing method, an image processing apparatus, and an electronic camera and, more particularly, to an image processing method, an image processing apparatus, and an electronic camera that can automatically correct a photographed image when photographing an image with a solid-state image sensing device such as a charge coupled device (CCD).

When photographing a dark scene with a camera or the like, the light emission of a flash is necessary. If the light-emitting capability of the flash is low with respect to the distance of the subject of the photograph, the emitted light does not reach the subject and an image of insufficient light quantity is obtained.

An automatic flash is often used to overcome this problem. The automatic flash works by obtaining distance information to the subject, determining the necessary quantity of light in accordance with the distance information and/or sensing the reflected light of the flash with a photosensitive sensor (light-adjusting sensor), and stopping the light emission of the flash when the quantity of reflection light reaches an adequate level.

However, the automatic flash requires high precision of measurement and good light emission control. In order to obtain the proper quantity of light at the time of photographing, a complicated control system and mechanism are necessary.

Technology for controlling the brightness of an image with precision by amplifying a photographed signal is disclosed in Japanese Patent Application Laid-open (JP-A) No. 2001-169178. With this technology, when an image is photographed with a flash, determination of whether light from the flash reaches the subject is obtained from a weighted mean of brightness by using image data of the photographed image, and adjusting the amplification factor of the image signal accordingly.

However, even when the value obtained from the image data at the time of photographing is small, there are cases when the light from the flash reaches the subject anyway. In other words, when the area on the photographed image of the subject is small, by averaging only that limited area, the photographed image might be mistakenly determined as being too dark. When this occurs, the amplification factor is increased more than necessary and the image of the subject is not displayed with proper brightness, or the image cannot be formed at the time of recording. Accordingly, there is a need for improved photographic devices and the like.

SUMMARY OF THE INVENTION

The present invention has been achieved in consideration of such circumstances and its object is to provide an image processing method and apparatus capable of correcting an insufficient quantity of light of a video signal with precision at the time of photographing with flashlight of an electronic still camera and obtaining an image in which brightness of a main subject is proper, and an electronic camera on which the apparatus is mounted.

An object of the invention is to attain an image processing method, an image processing apparatus, and an electronic camera capable of obtaining an image in which brightness of a main subject is proper at the time of photographing with flashlight of a flash device in consideration of the above facts.

An image processing method according to the invention for achieving the object includes the steps of: calculating the degree of brightness of a photographed image based on an image signal obtained from an image-sensing device using light emitted from a flash; calculating contrast of the photographed image from a degree of brightness of the photographed image; and determining an amplification factor of the image signal based on the degree of brightness and a contrast of the photographed image and amplifying the image signal with the amplification factor.

According to the image processing method of the invention, first, the degree of brightness of a photographed image is obtained on the basis of an image signal obtained from the image pickup device at the time of photographing with flashlight of a flash device. The degree of brightness of the photographed image denotes a characteristic value derived from a distribution of brightness of the whole photographed image and is determined by light from the subject and a surrounding light source at the time of photographing. Subsequently, the contrast of the photographed image is obtained from the degree of brightness of the photographed image. The contrast denotes the ratio of darkness and lightness of the photographed image. As the difference or ratio of the degree of brightness between the light portion and the dark portion increases, the contrast becomes higher. For example, when one person is photographed with flashlight in the dark and the flashlight reaches the person, the brightness of the person as the subject is high and the other portion is dark, so that the contrast is high.

On the basis of the obtained degree of brightness and the contrast of the photographed image, the amplification factor of the image signal is determined, and the image signal is amplified with the determined amplification factor. The amplification factor is determined so that the brightness of the subject in the photographed image is optimum. To be specific, even when the degree of brightness is low, if the contrast is high, the photographed image often includes the image of the subject properly illuminated with the flashlight. Consequently, when the degree of brightness is low and the contrast is high, by determining the amplification factor by using an area where the degree of brightness is high included in the photographed image as a reference, the amplification factor adapted to the photographed image of the subject at the time of photographing with flashlight can be determined, and an image of proper brightness can be accordingly obtained.

As the contrast of the photographed image, the ratio between a maximum value of brightness and a predetermined value (the minimum value or an average value) as the degree of brightness of the photographed image is used.

As described above, the degree of brightness of the photographed image is a characteristic value derived from the distribution of brightness of the whole image photographed. To obtain the characteristic value easily, it is sufficient to use the ratio between the maximum value of brightness and the predetermined value (the minimum value or the average value).

The process of amplifying the image signal is characterized in that the amplification factor of the image signal is determined on the basis of the degree of brightness of the photographed image obtained by the image pickup device and, when the contrast of the photographed image exceeds a predetermined contrast value, a suppression ratio of suppressing the amplification factor is determined on the basis of the contrast, and the image signal is amplified with the amplification factor to which the determined suppression ratio is added.

When the amplification factor is derived from the degree of brightness of the photographed image, an average amplification factor is obtained irrespective of the subject, an environment light source, and a surrounding environment. In this case, when the degree of brightness is low and the contrast is high, for example, when only a human is photographed with flashlight in the dark, the amplification factor tends to be high in the image area of the subject as the area where the degree of brightness included in the photographed image is large. Therefore, when the suppression ratio of suppressing the amplification factor is determined on the basis of the contrast and the image signal is amplified with the amplification ratio to which the determined suppression ratio is added, that is, when the suppression ratio is increased as the amplification factor increases, the amplification factor adapted to the photographed image of the subject at the time of photographing with flashlight can be determined, and an image of proper brightness can be obtained.

At least one of an upper limit value and a lower limit value is set for the suppression ratio determined.

It is preferable to set the upper limit value and/or the lower limit value for the suppression ratio determined so as not to correct the photographed image to an unnecessarily dark direction or to an unnecessarily light direction. Particularly, it is preferable to set the upper limit value to "1".

The degree of brightness is an average value of brightness of the photographed image or a weighted average value of brightness using a predetermined position in a photographed image as a reference.

Whether the light quantity of a photographed image is proper or not can be evaluated from an image signal photographed at the time of photographing with flashlight. To be specific, when the quantity of flashlight is improper with respect to a scene in the case such that the flashlight is insufficient, the quantity of light is insufficient. To determine the quantity of light, the average of brightness of the photographed image or the weighted average value of brightness using a predetermined position in a photographed image as a reference can be used. The brightness such as the quantity of light at the time of photographing with flashlight can be specified with high precision, and an image of proper brightness can be therefore obtained.

In the case of obtaining the degree of brightness of a photographed image, the photographed image is divided into a plurality of blocks, the degree of brightness is obtained on the block unit basis, and the degree of brightness is obtained on the basis of each of the degrees of brightness.

To obtain the degree of brightness, a more accurate value can be derived by obtaining brightness every pixel and finally obtaining the degree of brightness of the photographed image. However, the process becomes complicated. As the method of obtaining the degree of brightness of the photographed image, it is preferable to divide the photographed image into a plurality of blocks, obtain the degree of brightness of each block, for example, a numerical value indicative of brightness of each block, and obtain the degree of brightness on the basis of the values.

For example, a weighted factor according to the position in a screen is assigned to each of the plurality of blocks. As a characteristic value of the degree of brightness, an integrated value obtained by integrating image signals of each block is used. The degree of brightness can be obtained by adding multiplication values of all of the blocks, each multiplication value being calculated by multiplying an integrated value of the image signals of each block and a corresponding weighted factor, and dividing a result addition value by a sum of the weighted factors. By using the distribution of the weighted factors in the photographed image, the amplification factor can be determined so that the brightness of the main subject becomes proper.

At least one of the upper limit value and the lower limit value is set for the amplification factor determined. Particularly, the lower limit value of the amplification factor can be set to "1".

When the amplification factor of the image signal is too high, the S/N ratio of the image deteriorates. Consequently, it is preferable to set the upper limit value for the amplification factor determined so as to perform proper amplification. There is also an aspect of setting the lower limit value for the amplification factor determined so as not to correct the photographed image in the direction of unnecessarily darkening the image. Particularly, in the case of inhibiting the correction in the direction of darkening an image, the lower limit value is set to "1".

The image processing method can be easily realized by the following image processing apparatus. Specifically, the image processing apparatus is characterized by including: a brightness computing component for obtaining the degree of brightness of a photographed image based on an image signal obtained with an image-sensing device at the time of photographing with light emitted from a flash; a contrast computing component for obtaining contrast of the photographed image from the degree of brightness of the photographed image; a determining component for determining an amplification factor of the image signal based on the degree of brightness and the contrast of the photographed image; and an amplifying component for amplifying the image signal with the amplification factor.

By providing an electronic camera such as a digital camera with the function of the image processing method, a more effective image can be provided. To be specific, an electronic camera is characterized by including: an image-sensing device; a flash control component for controlling a flash so as to irradiate a subject of a photograph with auxiliary light when photographing; a storing component for storing an image signal obtained with the image-sensing device; an amplifying component for amplifying the image signal stored in the storing component; a control component for obtaining the degree of brightness of the photographed image, obtaining contrast of the photographed image from the degree of brightness of the photographed image, determining an amplification factor of the image signal based on the degree of brightness and contrast of the photographed image, and performing control of varying the amplification factor of the amplifying component in accordance with the amplification factor; and a recording component for recording an image onto a recording medium, said image obtained by amplifying the image signal with the amplifying component.

As described above, the invention produces effects such that, by determining the amplification factor on the basis of the degree of brightness and the contrast of a photographed image, the amplification factor adapted to the image of the subject at the time of photographing with flashlight can be determined and an image of proper brightness can be obtained.

DESCRIPTION OF THE PREFERRED EMBODIMENTS

An embodiment of the present invention will be described in detail hereinbelow with reference to the drawings. In the embodiment, the invention is applied to a digital camera.

Figure 1:
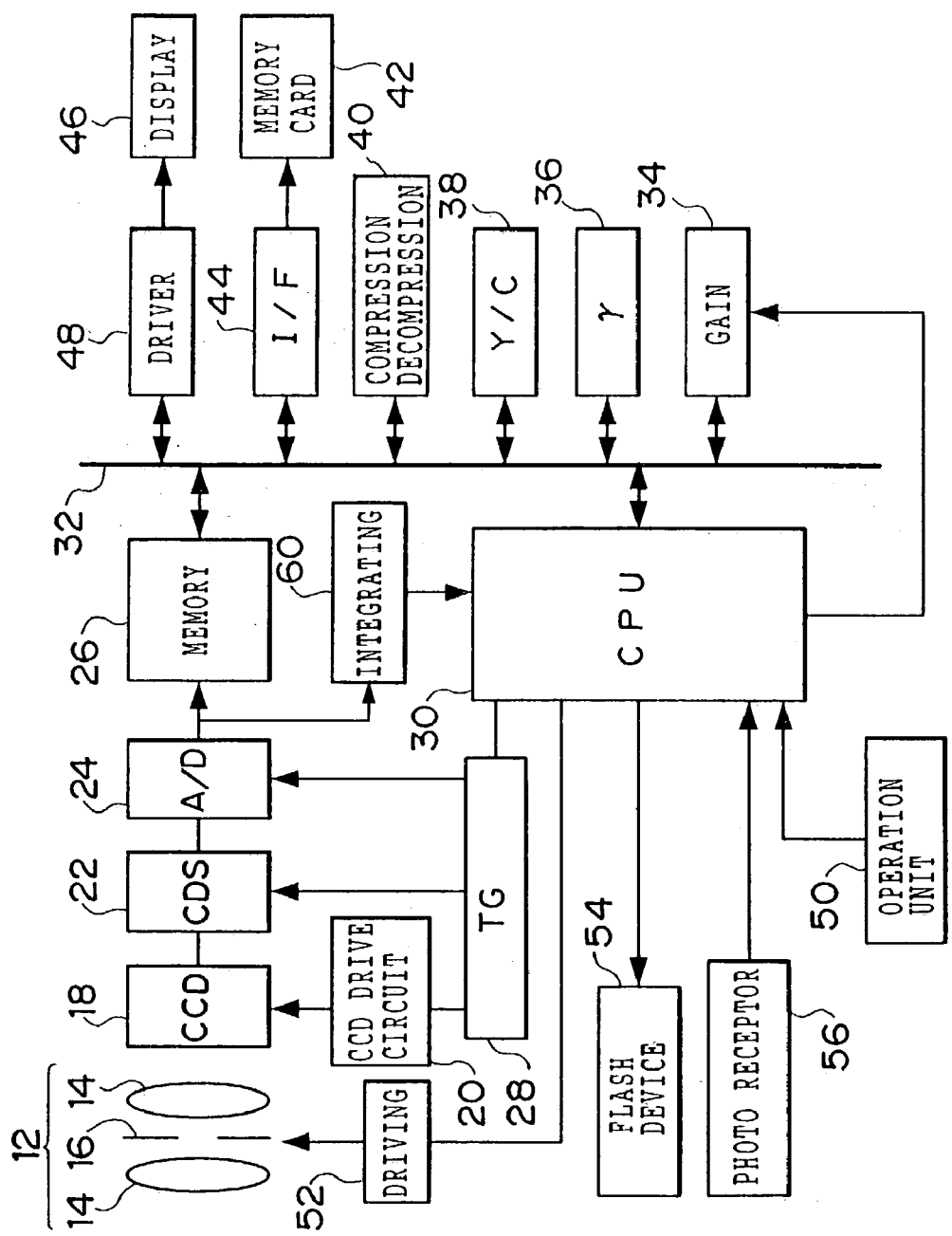
FIG. 1 is a block diagram of a digital camera according to an embodiment of the present invention.

FIG. 1 is a block diagram of a digital camera according to an embodiment of the invention. An optical system 12 of a camera 10 includes lenses 14 and an iris 16. A lens or a plurality of lenses constructs the lens 14. A lens having a single focal length (fixed focal length) or a lens whose focal length is variable such as a zoom lens or a lens whose focal length is switched between two focal lengths of the tele-side and the wide-angle side may be employed.

An image of the subject formed on a photosensitive face of a CCD 18 via the optical system 12 is converted into a signal charge of an amount according to the quantity of incident light by sensors. The signal charge accumulated is read by a CCD drive pulse applied from a CCD drive circuit 20 and is sequentially output as a voltage signal (analog image signal) according to the signal charges from the CCD 18.

The CCD 18 is provided with a shutter drain via a shutter gate. By driving the shutter gate by shutter gate pulses, the accumulated signal charge can be discharged to the shutter drain. In other words, the CCD 18 has a so-called electronic shutter function of controlling accumulation time (shutter speed) of charges accumulated in the sensors by the shutter gate pulse.

A signal read from the CCD 18 is subjected to a correlated double sampling (CDS) process in a CDS circuit 22 and a color separating process so as to be separated into color signals of R, G, and B, and the signal level of each of the color signals is adjusted (pre-white balance process).

The image signal subjected to the predetermined analog signal processes is supplied to an A/D converter 24 and converted into digital signals of R, G, and B by the A/D converter 24, and the digital signals are stored into a memory 26.

A timing signal generating circuit (TG) 28 supplies proper timing signals to the CCD drive circuit 20, CDS circuit 22, and A/D converter 24 in accordance with a command from a CPU 30. Each of the circuits is driven synchronously with the timing signals supplied from the timing signal generating circuit 28.

The CPU 30 is a control component for performing centralized control on the circuits of the camera 10 and is connected via a bus 32 to a gain adjustment circuit 34, a gamma correction circuit 36, a luminance and color difference signal processing circuit (YC processing circuit) 38, a compressing/decompressing circuit 40, a card interface 44 of a memory card 42, a display driver 48 for driving a display 46, and the like.

The CPU 30 controls a corresponding circuit block on the basis of an input signal from an operation unit 50 and controls an operation of zooming the lens 14, an operation of auto focus (AF) adjustment, automatic exposure (AE) adjustment, or the like.

The operation unit 50 includes a release button for giving an instruction to start of recording of an image, a camera mode selecting component, a zooming operation component, and other various input components. The input components take various forms of a switch button, a dial, a sliding lever, and the like and also a form of displaying a setting menu and selection items on a touch panel or a screen of a liquid crystal monitor display and allowing the user to select a desired item by a cursor. The operation unit 50 may be disposed in the camera body or separated from the camera body as a remote-control transmitter.

Figure 4:
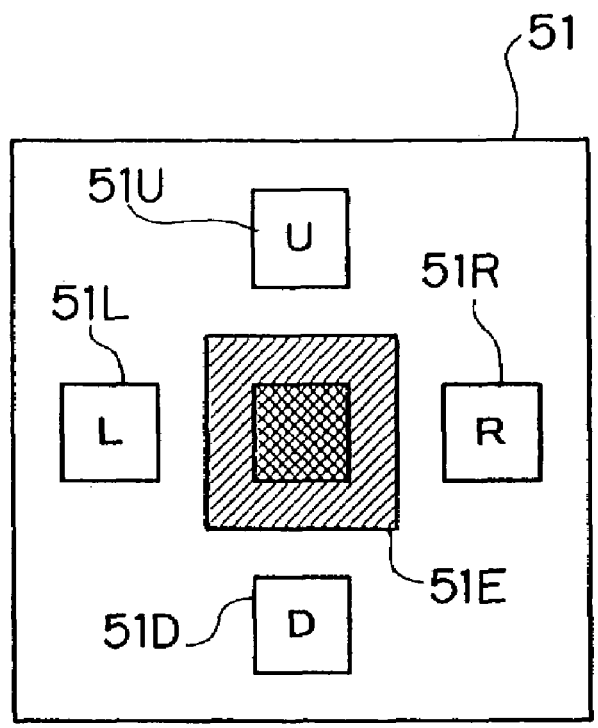
FIG. 4 is a diagram showing a schematic configuration of focus position setting buttons.

In the embodiment, one of the input components of the operation unit 50 further includes focus position setting buttons 51 (refer to FIG. 4). The focus position setting buttons 51 are used to instruct the position of a main subject in the screen at the time of photographing an image of the subject by the camera 10.

Specifically, usually the position of the main subject is assumed in the center of the screen and it is set to achieve focus on the subject in the center of the screen. There is however a case of photographing while setting a main subject in a position off from the center portion of the screen in a composition (scene) assumed by the user. In this case, focus is not achieved on the main subject but is achieved on a subject in the center portion. In the embodiment, a focus position can be set in a main subject in a scene where the main subject is positioned off from the center portion of the screen.

FIG. 4 shows a conceptual configuration of the focus position setting buttons 51. The focus position setting buttons 51 are constructed by an instruction button 51U for an instruction of moving the focus position upward from an initial position, an instruction button 51D for an instruction of moving the focus position downward from the initial position, an instruction button 51L for an instruction of moving the focus position to the left from the initial position, an instruction button 51R for an instruction of moving the focus position to the right from the initial position, and an instruction button 51E for an instruction of selecting a focus area. By operating the focus position setting buttons 51, a desired item in a setting menu or selection items displayed on a touch panel or the screen of the liquid crystal monitor display may be selected by the cursor.

Figure 5:
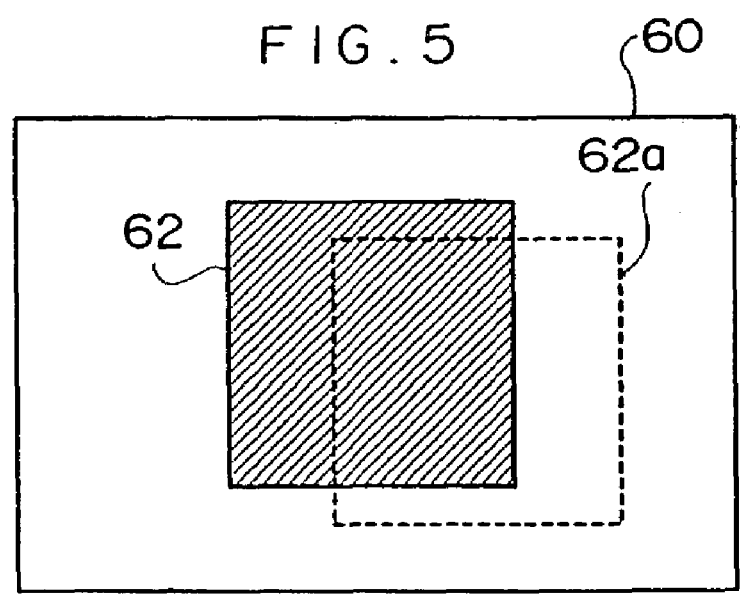
FIG. 5 is a diagram showing a process of changing a focus area in response to an instruction given by using the focus position setting buttons.

FIG. 5 shows a focus position in a screen (for example, an image in a finder) 60 as a photographed image. In the example, a focus area 62 indicates the position of the center of the screen initially set. It shows a state in which the focus position is changed from the position of the focus area 62 in the center of the screen which is initially set to the position of the focus area 62a by depressing the instruction button 51R and the instruction button 51D. As for the size of the focus area 62, a predetermined focus area size can be instructed or one of a plurality of predetermined focus area sizes can be selected and instructed by depressing the instruction button 51E. By the operation, the size of the focus area can be changed according to the size of the main subject.

The CPU 30 in FIG. 1 performs various computing operations such as a focus evaluating operation and an AE operation on the basis of an image signal output from the CCD 18 and, on the basis of the computing operation, controls the driving component (such as an AF motor and an iris motor) 52 of the lens 14 and the iris 16 to move the focus lens to the focus position and set the iris 16 to a proper f number.

For example, for the AF control, a contrast AF method of moving the focus lens so that a high frequency component of a G signal becomes the maximum is employed. In the AE control, a subject's luminance (EV) is obtained on the basis of an integral value obtained by integrating R, G, and B signals of one frame, an f number and a shutter speed are determined on the basis of the EV, the iris 16 is driven via the driving component 52, and time of accumulating charges of the CCD 18 is controlled by an electronic shutter so that the shutter speed becomes the determined shutter speed. Therefore, only by directing the lens 14 of the camera 10 toward the subject, optimum exposure adjustment is performed and focusing is automatically performed.

At the time of recording an image, an accurate EV is obtained by repeating the above-described light measuring operation a plurality of times when the release button is touched, and the f number and the shutter speed at the time of photographing are finally determined on the basis of the EV. When the release button is depressed, the iris 16 is driven so as to achieve the finally determined f number, and the time of accumulating charges is controlled by the electronic shutter so as to achieve the determined shutter speed. The AE and AF control may be performed by not only the method of performing a control on the basis of an image signal obtained from the CCD 18 but also a method of using a known range sensor such as photometric sensor and AF phototransmitting and photosensitive sensor, or the like.

The camera 10 also has a flash device 54 and a photo receptor 56 for adjusting light and is set, in accordance with the operation of a flash mode setting button included in the operation unit 50, in a "low-luminance automatic light emission mode" of allowing the flash device 54 to automatically emit flashlight when the luminance is low, a "forced light emission mode" for making the flash device 54 emit flashlight irrespective of the luminance of the subject, a "light emission inhibited mode" of inhibiting light emission of the flash device 54, or the like.

The CPU 30 controls charging of a main capacitor of the flash device 54 or a timing of discharging light (light emission) to a light-emitting tube (for example, a xenon tube), and controls to stop the light emission on the basis of a result of measurement from the photo receptor 56 in accordance with a flash mode selected by a user. The photo receptor 56 receives reflection light from the subject irradiated with flashlight of the flash and converts the reflection light to an electric signal according to the quantity of received light. Signals of the photo receptor 56 are integrated by a not-shown integrating circuit. When the integrated quantity of received light reaches a proper quantity of received light, light emission of the flash is stopped.

Data output from the A/D converter 24 is stored in the memory 26 and is also supplied to an integrating circuit 60. The integrating circuit 60 divides the screen into a plurality of blocks (for example, 8×8=64 blocks), and integrates G signals received on the block unit basis. It is also possible to generate the luminance signal (Y signal) from data of R, G, and B and integrate the luminance signals. An AE computing circuit may also serve as the integrating circuit 60. Information (the result of computation) of the integrated value obtained by the integrating circuit 60 is input to the CPU 30.

On the basis of the information received from the integrating circuit 60, the CPU 30 calculates an evaluation value E of the photographed screen in accordance with an algorithm which will be described later and determines a gain value (amplification factor) in the gain adjustment circuit 34 by using the obtained evaluation value E. The CPU 30 controls a gain amount in the gain adjustment circuit 34 in accordance with the determined gain value.

The image data of R, G, and B stored in the memory 26 is transmitted to the gain adjustment circuit 34 and amplified. The amplified image data is subjected to a gamma correcting process in the gamma correction circuit 36 and the resultant data is transmitted to the YC processing circuit 38 where the RGB data is converted to a luminance signal (Y signal) and color difference signals (Cr and Cb signals).

The luminance and color difference signals (called YC signals) generated by the YC processing circuit 38 are stored into the memory 26. The YC signals stored in the memory 26 are supplied to the display driver 48 and converted into a signal of a predetermined system (for example, a color composite video signal of the NTSC system) and the signal is output to the display 46. As the display 46, a display capable of displaying a color image such as a liquid crystal display is used. The display 46 of a type capable of inputting the YC signals may be applied or the display 46 of an RGB signal input type may be employed. A driver corresponding to the display is applied.

The image data is periodically rewritten by the image signal output from the CCD 18 and a video signal generated from the image data is supplied to the display 46, thereby displaying images photographed by the CCD 18 as motion images (live images) in a real-time manner or, although not in the real-time manner, displaying images as almost successive images on the display 46.

The display 46 can be used as an electronic view finder. The user can recognize the angle of view by an image displayed on the display 46 or a not-shown optical finder. In response to a predetermined recording instruction (photographing start instruction) operation such as an operation of depressing a release button, photographing of image data for recording is started.

When the user inputs a recording instruction from the operation unit 50, the CPU 30 sends a command to the compressing/decompressing circuit 40 as necessary and the compressing/decompressing circuit 40 accordingly compresses the YC data on the memory 26 in conformity with the JPEG format or other predetermined format. The compressed image data is recorded into the memory card 42 via the card interface 44.

In the case where the mode (non-compression mode) of recording the image data which is not compressed is selected, without performing a compressing process by the compressing/decompressing circuit 40, the image data which is not compressed is recorded as it is into the memory card 42.

In the camera 10 of the embodiment, the memory card 42 is used as a component for storing image data. Specifically, a recording medium such as the Smart Media is applied. The form of the recording medium is not limited to the Smart Media but various forms such as PC card, micro drive, a multi-media card (MMC), magnetic disk, optical disk, magnetooptic disk, and memory stick can be used. A signal processing component and an interface adapted to the medium used are employed.

In a reproduction mode, image data read from the memory card 42 is decompressed by the compressing/decompressing circuit 40 and the decompressed image data is output to the display 46 via the driver 48.

The memory 26 and the memory card 42 of the embodiment correspond to a storing component of the invention, and the CPU 30 includes the functions of a flash control component and a control component of the invention. The gain adjustment circuit 34 corresponds to an amplifying component of the invention, and the process of recording image data to the memory card 42 corresponds to the function of a recording component of the invention.

Image correction in the digital camera of the embodiment will now be described.

Figures 2, 3:
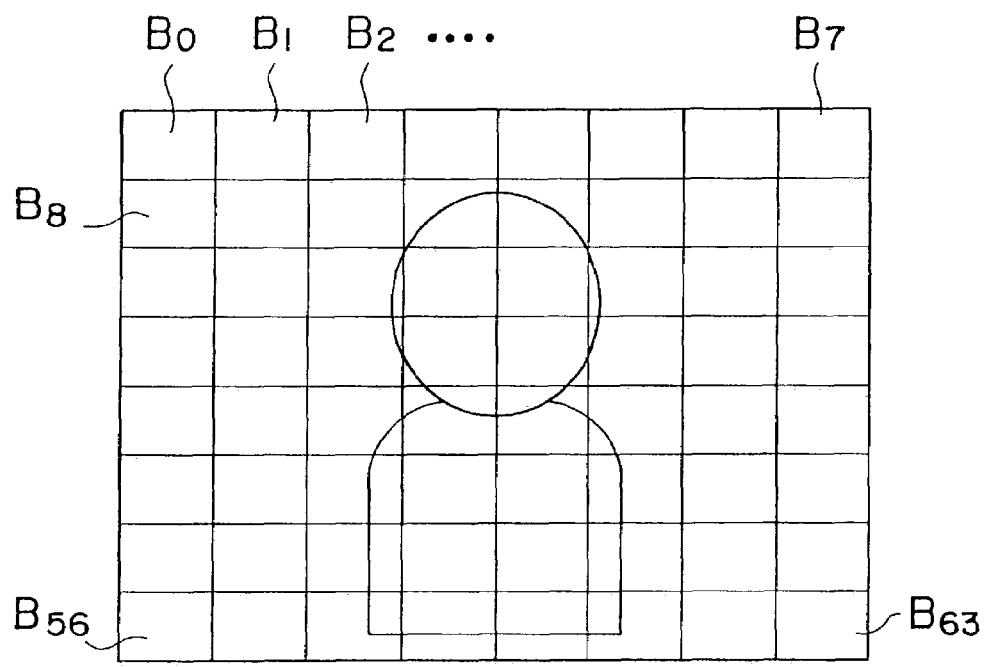
FIG. 2 is a diagram showing an example of a divided form of a photographed image in an integrating circuit used for image correction.
FIG. 3 is a diagram showing an example of weighted factors Wi assigned to blocks of the image.

As shown in FIG. 2, the screen is divided into 8×8 blocks in the integrating circuit 60. In each of the blocks Bi (i=0, 1, 2, . . . , and 63), an integrated value Si of the G (green) signal in an image signal is calculated. As shown in FIG. 3, a weighted factor Wi (i=0, 1, 2, . . . , and 63) is predetermined for each block. A relatively large weighted factor Wi is determined in the center portion of the screen. With distance from the center, the weighted factor Wi decreases.

Since the main subject is often placed in the center portion of the screen, by setting the distribution of the weighted factors as shown in FIG. 3, evaluation in which the state of the subject in the center portion of the image is sufficiently reflected can be made. The invention is not limited to the arrangement of the weighted factors shown in FIG. 3 and the arrangement of the weighted factors determined according to the distribution in the screen in which the position of the main subject is predetermined can be employed.

In the case where the focus position is changed by the instruction of the user (instruction of the focus position by the focus position setting buttons 51 shown in FIG. 4), the weighted factor distribution shown in FIG. 3 is moved in correspondence with the changed focus position when the focus position is changed, thereby enabling the main subject in which the instruction of the user is reflected to be grasped.

Figure 6:
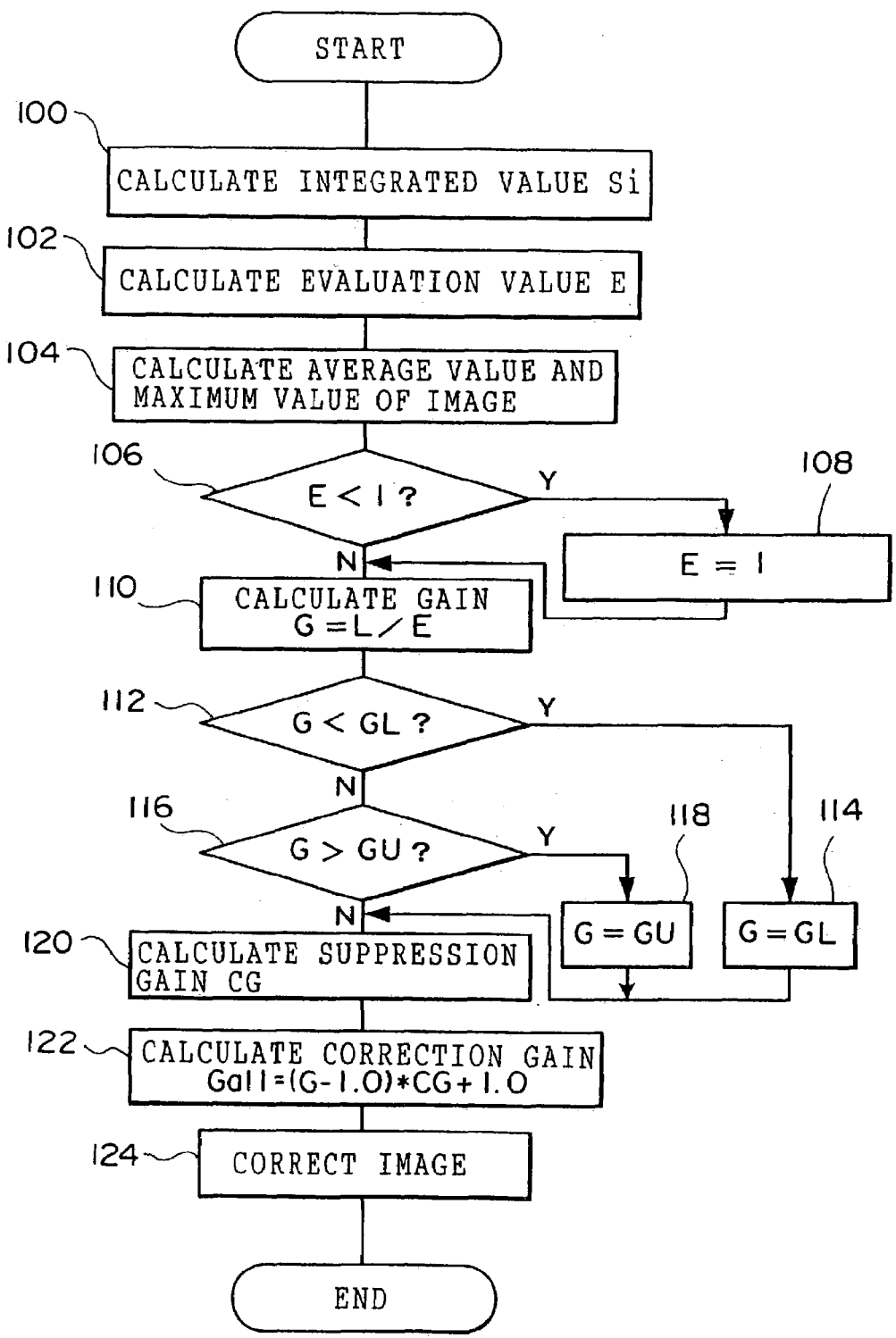
FIG. 6 is a flowchart showing the flow of processes of image correction in a camera according to the embodiment of the present invention.

Image correction on a photographed image will now be described. FIG. 6 is a flowchart showing the flow of image correction according to the embodiment. An image is photographed by photographing with flashlight, and an image correcting routine shown in FIG. 6 is executed. First, in step 100, an integrated value of brightness of the photographed image is calculated. To be specific, the CPU 30 calculates the integrated value Si of the G (green) signals in image signals included in each block Bi (i=0, 1, . . . , and 63) on the basis of information from the integrating circuit 60. After calculation of the integrated value Si of each block is finished, the program advances to step 102 where the evaluation value E is calculated by the following Equation (1) by using the weighted factor Wi (refer to FIG. 3).

$$E = \frac{\sum_{i=0}^{63} S_i \times W_i}{\sum_{i=0}^{63} W_i} \quad (1)$$

The evaluation value E is calculated by adding values each obtained by multiplying the integrated value Si with the weighted factor Wi (Si×Wi) of each block Bi with respect to all of the blocks i (=0 to 63) and dividing the resultant value by the sum of the weighted factors Wi (calculating the weighted mean).

In step 104, an average value and a maximum value of brightness of the photographed image are calculated. This is an element data calculating process for obtaining the tendency of contrast of the photographed image, and a value of the tendency of contrast (hereinbelow, called a contrast value Ct) corresponds to a rate of variability with respect to brightness of the photographed image. In the embodiment, the ratio between the maximum value of brightness included in the photographed image and the average value of brightness of the photographed image, which is represented by the following Equation (2), is employed as the contrast value.

$$Ct = C\text{ave}/C\text{max} \quad (2)$$

wherein Cmax denotes the maximum value of brightness included in the photographed image and Cave indicates the average value of brightness of the photographed image.

In place of the average value of brightness, the minimum value of brightness or a specific value indicative of brightness of an average level or low level obtained by a predetermined function may be used. In the embodiment, by using the integrated value Si of the G (green) signals in the image signals in the blocks i (=0 to 63), the contrast value Ct is calculated. In this case, since the main subject (an image of the main subject) is often distributed in the center portion of a photographed image, it is preferable to obtain the maximum value and the average value of brightness of the block in the center portion of the photographed image.

In the case where the focus position is changed by the user's instruction (instruction of the focus position by the focus position setting buttons 51 shown in FIG. 4), the area of the changed focus area is used as the area of the main image and the maximum value and the average value of brightness of the block of the changed focus area are obtained. By the operation, the contrast of the main subject in which the instruction of the user is reflected can be grasped.

In step 106, whether the evaluation value E as a result of calculation of Equation (1) is smaller than "1" or not is determined. If the determination is affirmative, the program advances to step 108 where the evaluation value E is replaced by "1" and the program advances to step 110. That is, when the evaluation value E is smaller than 1, the evaluation value E is clipped to "1" (E=1). If the determination is negative in step 106, that is, when the evaluation value E is equal to or larger than "1", the program advances to step 110.

In step 110, by using the evaluation value E calculated as described above, the gain G indicative of the amplification degree of an image signal is calculated by the following Equation (3).

$$G = L/E \quad (3)$$

wherein L denotes a value indicative of a predetermined target level.

Subsequently, the calculated gain G is clipped to a value between a predetermined upper limit value (GU, for example, 2.0) and a lower limit value (GL, for example, 1.0). First, in step 112, whether the calculated gain G is lower than the lower limit value GL or not is determined. If the determination is affirmative, the program advances to step 114 where the gain G is replaced with the lower limit value GL, and the program advances to step 120. That is, when the gain G is lower than the lower limit value GL, G is clipped to GL (G=GL).

If the determination is negative in step 112, that is, when the gain G is equal to or higher than the lower limit value GL, the program advances to step 116. In step 116 whether the gain G exceeds the upper limit value GU or not is determined. If the determination is affirmative, the program advances to step 118 where the gain G is replaced with the upper limit value GU, and the program advances to step 120. That is, when the gain G is higher than the upper limit value GU, G is clipped to GU (G=GU).

The reason why the gain G is clipped to the upper limit value is that when the gain amount is too large, the S/N ratio of the image deteriorates, so that amplification is limited to the proper gain amount. The upper limit value GU may be variously set. For example, when an image signal is expressed by eight bits, the upper limit of the amplification ratio is determined as a value up to three times. In the case where the user does not want to correct an image to a darker image, it is sufficient to set "1" as the lower limit value GL.

In step 120, a suppression gain CG is calculated. The suppression gain CG is used to properly correct the brightness of the subject, for example, even in a scene in which the background is dark by suppressing the gain G by which the image is corrected unconditionally in accordance with brightness when the contrast of a photographed image is high.

Figure 7:
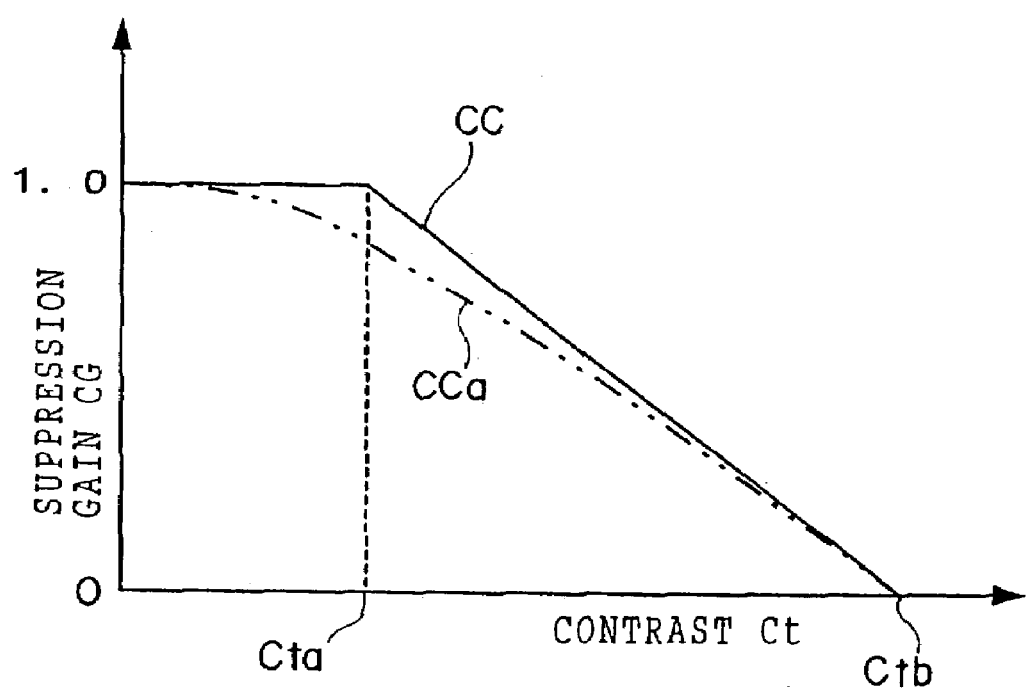
FIG. 7 is a characteristic graph showing the relation between contrast and a suppression gain.

As shown in FIG. 7, in the embodiment, the suppression gain CG is determined by the contrast value Ct. Specifically, a characteristic CC indicative of the relation between the suppression gain CG and the contrast value CT is predetermined and the suppression gain CG corresponding to the contrast value Ct obtained in step 104 is calculated. The characteristic CC is a characteristic in which the suppression gain CG maintains the upper limit value 1.0 up to the predetermined contrast value Cta and gradually decreases to the maximum value Ctb of the contrast value Ct. That is, as the calculation result of Equation (2) increases, the suppression gain CG decreases. In other words, as the contrast of a photographed image becomes higher, the suppression gain CG decreases, or as the contrast of a photographed image becomes lower, the suppression gain CG increases.

The upper limit value is set for the suppression gain for the reason that, if the suppression amount is too large, a case such that the inherent gain amount of an image cannot be assured is expected, so that the suppression is regulated to a proper gain amount.

The contrast value Cta is the contrast value Ct at the boundary at which it is assumed that flashlight does not reach the subject, and is an average value or a statistic of the contrast value Ct determined as a value at which little influence is exerted on the image of the subject even when correction is made by using the gain G calculated in step 110. The contrast value Ct is derived by an experiment or the like. In the embodiment, the case of using the characteristic CC in which the suppression gain CG maintains 1.0 up to the contrast value Cta will be described. However, the invention is not limited to the case. For example, a characteristic CCa in which the suppression gain CG gradually decreases as the contrast value Ct increases can be also employed.

In step 122, by the following Equation (4) using the gain G calculated in step 110 and the suppression gain CG calculated in step 120, a correction gain Gall used for finally correcting an image is calculated.

$$Gall = (G-1.0) \cdot CG + 1.0 \quad (4)$$

The correction gain Gall calculated in step 122 is used to obtain a correction value in which the gain G is suppressed according to the strength of the contrast value Ct. Specifically, on assumption that when the contrast is high, flashlight reaches the subject and an image in which the brightness of the subject is proper is obtained, the gain G obtained from brightness is suppressed, thereby obtaining the gain for lessening an image correction amount on an image of a main subject is calculated.

An equation for calculating the correction gain Gall is not limited to Equation (4). Any equation may be used as long as a gain which lessens the image correction amount on an image of a main subject is obtained by suppressing the gain G derived from brightness with respect to an image which is obtained, for example, when flashlight reaches the subject and in which the brightness of the subject is proper. The equation may be constructed by using a polynomial or an arbitrary function.

In step 124, the image signal is amplified by the gain adjustment circuit 34 in accordance with the correction gain Gall determined in step 122, thereby correcting the photographed image. After that, the routine is finished.

The processes in steps 100 and 102 in the embodiment correspond to the function of a brightness computing component of the invention, and the process in step 104 corresponds to the function of a contrast computing component of the invention. The processes from step 106 to step 122 correspond to the function of a determining component of the invention and the process in step 124 corresponds to the function of an amplifying component.

As described above, in the camera 10 according to the embodiment, in the case where the quantity of light of a photographed image is insufficient on the basis of the evaluation value E, an image signal is amplified by the gain adjustment circuit 34 in accordance with the degree of insufficiency. Consequently, when an insufficient quantity of light of the flash device and insufficient control precision of the light emission quantity is compensated and an image in which the brightness of the main subject is proper (for example, a bright image such that the face of a human as the main subject can be seen when the image is displayed on the display 46) can be obtained.

In the embodiment, the contrast of the photographed image is calculated and the gain of the image signal amplified by the gain adjustment circuit 34 is determined in accordance with the contrast. That is, whether flashlight reaches the main subject or not is determined on the basis of the contrast and the gain G determined according to the brightness of the photographed image is suppressed on the basis of the determination result value (contrast value). Consequently, on assumption that when the contrast is high, flashlight reaches the subject and an image in which the brightness of the subject is proper is obtained, the gain G obtained from brightness is suppressed, and the image correction amount on the image of the main subject can be lessened. Therefore, even in the case where an image is photographed in environment of a dark background, an image where the brightness of the main subject is proper (for example, an image in which the face of a human as the main subject or the like can be seen when the image is displayed on the display 46) can be obtained.

What is claimed is:

1. An image processing method comprising the steps of:
    calculating the degree of brightness of a photographed image based on an image signal obtained from an image-sensing device using light emitted from a flash;
    calculating contrast of the photographed image from a degree of brightness of the photographed image; and
    determining an amplification factor of the image signal based on the degree of brightness and a contrast of the photographed image and amplifying the image signal with the amplification factor, wherein the degree of brightness is obtained based on the degree of brightness of each of a plurality of blocks derived by dividing an entire photographed image into the plurality of blocks and adding multiplication values of all of the blocks, each multiplication value being calculated by multiplying an integrated value of the image signals of each block and a weighted factor Wi determined for each block in accordance with the position, and dividing a resulting addition value by a sum of the weighted factors, the weighted factor Wi for the respective blocks decreases with distance from a center of the photographed image.

2. The image processing method of claim 1, wherein the contrast of the photographed image is any one of a ratio between a maximum value of brightness and a minimum value of brightness and a ratio between a maximum value of brightness and an average value of brightness.

3. The image processing method of claim 1, wherein the amplification factor is obtained based on the degree of brightness of the photographed image and, when the contrast of the photographed image exceeds a predetermined value, the amplification factor is determined by adding a suppression ratio that suppresses the amplification factor based on the contrast.

4. The image processing method of claim 3, wherein at least one of an upper limit value and a lower limit value is set for the suppression ratio.

5. The image processing method of claim 4, wherein the upper limit value is 1.

6. The image processing method of claim 1, wherein at least one of an upper limit value and a lower limit value is set for the amplification factor.

7. The image processing method of claim 6, wherein the lower limit value of the amplification factor is 1.

8. An image processing apparatus comprising:

a brightness computing component for obtaining the degree of brightness of a photographed image based on an image signal obtained with an image-sensing device at the time of photographing with light emitted from a flash;

a contrast computing component for obtaining contrast of the photographed image from the degree of brightness of the photographed image;

a determining component for determining an amplification factor of the image signal based on the degree of brightness and the contrast of the photographed image; and an amplifying component for amplifying the image signal with the amplification factor, wherein the degree of brightness is obtained based on the degree of brightness of each of a plurality of blocks derived by dividing an entire photographed image into the plurality of blocks and adding multiplication values of all of the blocks, each multiplication value being calculated by multiplying an integrated value of the image signals of each block and a weighted factor Wi determined for each block in accordance with the position, and dividing a resulting addition value by a sum of the weighted factors, the weighted factor Wi for the respective blocks decreases with distance from a center of the photographed image.

9. The image processing apparatus of claim 8, wherein the contrast of the photographed image is any one of a ratio between a maximum value of brightness and a minimum value of brightness and a ratio between a maximum value of brightness and an average value of brightness.

10. The image processing apparatus of claim 8, wherein the amplification factor is obtained based on the degree of brightness of the photographed image and, when the contrast of the photographed image exceeds a predetermined value, the amplification factor is determined by adding a suppression ratio that suppresses the amplification factor based on the contrast.

11. An electronic camera comprising:

an image-sensing device;

a flash control component for controlling a flash so as to irradiate a subject of a photograph with auxiliary light when photographing;

a storing component for storing an image signal obtained with the image-sensing device;

an amplifying component for amplifying the image signal stored in the storing component;

a control component for obtaining the degree of brightness of the photographed image, obtaining contrast of the photographed image from the degree of brightness of the photographed image, determining an amplification factor of the image signal based on the degree of brightness and contrast of the photographed image, and performing control of varying the amplification factor of the amplifying component in accordance with the amplification factor; and a recording component for recording an image onto a recording medium, the image obtained by amplifying the image signal with the amplifying component, wherein the degree of brightness is obtained based on the degree of brightness of each of a plurality of blocks derived by dividing an entire photographed image into the plurality of blocks and adding multiplication values of all of the blocks, each multiplication value being calculated by multiplying an integrated value of the image signals of each block and a weighted factor Wi determined for each block in accordance with the position, and dividing a resulting addition value by a sum of the weighted factors, the weighted factor Wi for the respective blocks decreases with distance from a center of the photographed image.

12. The electronic camera of claim 11, wherein the contrast of the photographed image is any one of a ratio between a maximum value of brightness and a minimum value of brightness and a ratio between a maximum value of brightness and an average value of brightness.

13. The electronic camera of claim 11, wherein the amplification factor is obtained based on the degree of brightness of the photographed image and, when the contrast of the photographed image exceeds a predetermined value, the amplification factor is determined by adding a suppression ratio for suppressing the amplification factor based on the contrast.

* * * * *